United States Patent [19]

Perugini

[11] Patent Number: 4,925,353
[45] Date of Patent: May 15, 1990

[54] DRIVE FASTENING SYSTEM

[75] Inventor: Michael N. Perugini, Southington, Conn.

[73] Assignee: Litton Systems, Inc., Watertown, Conn.

[21] Appl. No.: 201,253

[22] Filed: May 25, 1988

Related U.S. Application Data

[63] Continuation-in-part of Ser. No. 54,957, May 28, 1987, abandoned.

[51] Int. Cl.⁵ .............................................. F16B 15/08
[52] U.S. Cl. ................................... 411/453; 411/279; 411/230; 411/922; 411/394
[58] Field of Search ........ 411/230, 427, 936, 274–275, 411/922, 537–538, 446–447, 394, 451–453, 473, 448, 449, 454, 486, 923, 279

[56] References Cited

U.S. PATENT DOCUMENTS

| | | | |
|---|---|---|---|
| R. 15,925 | 10/1924 | Whippey . | |
| 233,718 | 10/1880 | Warner . | |
| D. 264,807 | 6/1982 | Baumgartner | D8/387 |
| 323,560 | 8/1885 | Burdick | 411/230 |
| 1,062,905 | 5/1913 | Gadd | 411/922 X |
| 1,103,444 | 7/1914 | Standfest | 411/451 |
| 1,117,084 | 11/1914 | Phelps | 248/DIG. 6 X |
| 1,637,524 | 8/1927 | Harriman | 411/275 |
| 1,857,388 | 5/1932 | Linderman et al. . | |
| 1,956,745 | 5/1934 | Payne | 151/37 |
| 2,037,586 | 4/1936 | Olson | 151/35 |
| 2,041,809 | 5/1936 | Bernhard | 287/58 |
| 2,112,494 | 3/1938 | Olson | 151/32 |
| 2,128,757 | 8/1938 | Olson | 151/32 |
| 2,183,243 | 12/1939 | Meersteiner | 411/453 |
| 2,204,849 | 6/1940 | Ericson | 411/486 |
| 2,226,491 | 12/1940 | Gustafson | 151/32 |
| 2,253,241 | 8/1941 | MacDonald | 151/37 |
| 2,287,843 | 6/1942 | Tvrzicky | 411/457 X |
| 2,332,404 | 10/1943 | Smith | 280/11.13 |
| 2,372,779 | 4/1945 | Herman et al. | 164/78 |
| 3,047,036 | 7/1962 | Waltermire | 151/41.73 |
| 3,221,793 | 12/1965 | Gutshall | 151/38 |
| 3,252,495 | 5/1966 | Waltermire | 151/41.73 |
| 3,438,417 | 4/1969 | Albris | 151/37 |
| 4,350,465 | 9/1982 | Lovisek | 411/186 |

FOREIGN PATENT DOCUMENTS

| | | | |
|---|---|---|---|
| 379784 | 6/1930 | Belgium . | |
| 501432 | 2/1951 | Belgium . | |
| 915732 | 7/1954 | Fed. Rep. of Germany . | |
| 23206 | 5/1921 | France | 411/453 |
| 723295 | 1/1932 | France . | |
| 1005851 | 1/1952 | France . | |
| 12406 | of 1915 | United Kingdom . | |
| 395331 | 10/1931 | United Kingdom | 411/275 |
| 483788 | 4/1938 | United Kingdom . | |
| 483646 | 8/1938 | United Kingdom | 411/452 |

Primary Examiner—Rodney M. Lindsey
Assistant Examiner—F. Saether
Attorney, Agent, or Firm—Brian L. Ribando

[57] ABSTRACT

A fastening system for securing an article to a base uses a conventional drive fastener. A reaction surface on the article contacts the bearing surface on the underside of the fastener head causing the fastener head to tilt relative to the body of the fastener. The reaction surface also causes the body of the drive fastener to deform when it is fully driven into the article, and a portion of the material from the reaction surface is displaced into the aperture to increase the retention force of the fastener.

43 Claims, 4 Drawing Sheets

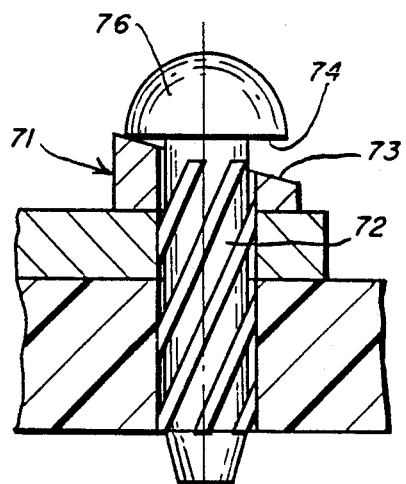
Fig_14
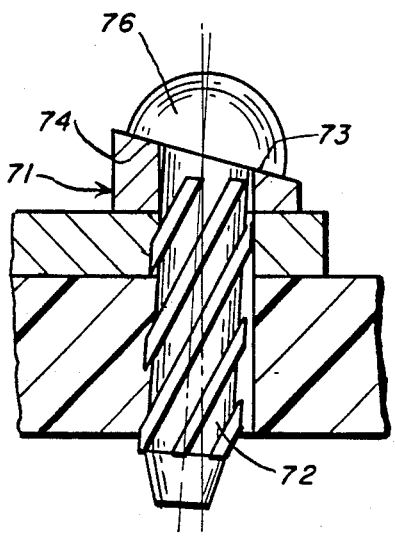
Fig_15
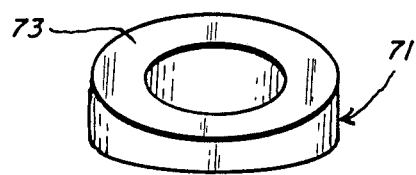
Fig_16
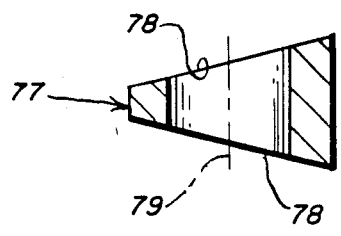
Fig_17

DRIVE FASTENING SYSTEM

This is a continuation-in-part of co-pending application Ser. No. 054,957 filed on May 28, 1987 now abandoned.

BACKGROUND OF THE INVENTION

This invention relates to drive fasteners and to a drive fastening system in which the drive fastener is deformed to increase the retention force thereof.

Drive fasteners are well known in the art. A drive fastener comprises an elongated body having an enlarged head which is driven into preformed apertures formed in the articles which are to be fastened together. According to conventional manufacturing techniques, when using a drive fastener to fasten an item to a base, the aperture in the item is sized to present a clearance fit to the fastener, while the aperture in the base is smaller to create an interference fit with the fastener. The interference fit between the base aperture and the fastener creates a retention force which holds the fastener in the aperture and the item to the base.

Drive fasteners may be either rotational or nonrotational. Rotational fasteners are formed with helical splines along the length of the fastener which form complementary threads in the aperture in the base upon the application of a pushing force to the drive fastener head.

A problem arises, however, since the retention force of a rotational drive fastener is related to the number of splines per inch. Since the number of splines per inch is low, the retention force is not as great as a conventional screw. As a result, a rotational drive fastener will fail by counter-rotating out of the self-threaded apertures upon the application of a force to the fastener which is opposite in direction to the insertion force.

Nonrotational drive fasteners are formed with a knurled or ribbed pattern along the length of the fastener which becomes imbedded in the base aperture, or with no pattern at all. Such nonrotational fasteners are susceptible to failure by withdrawing from the base aperture upon an application of a suitable force to the fastener.

SUMMARY AND OBJECTS OF THE INVENTION

According to the invention, a drive fastening system utilizes a conventional drive fastener which deforms as it is driven to a final seated position. A reaction surface which surrounds the aperture into which the fastener is inserted forces the head of the fastener to tilt relative to the axis of the aperture. In one embodiment, the reaction surface is planar and sloped relative to a plane which is perpendicular to the axis of the aperture; and in another embodiment, the reaction surface is stepped to present two levels of contact to the underside of the drive fastener head. In a further embodiment, the bearing surface of the fastener is formed with a protrusion which when forced against the reaction surface causes the drive fastener head to tilt relative to the axis of the aperture.

In all embodiments, whether a rotational or a nonrotational fastener is used, the reaction surface causes a tilting of the fastener head relative to the axis of the aperture, or a deformation of the fastener body, or both. After the fastener has been inserted, the deformed fastener exhibits a higher retention force than a conventional drive fastener.

It is, accordingly, an object of the invention to provide a drive fastener system which develops a higher retention force than prior art drive fastener systems.

It is another object of the invention to provide an improved drive fastener system which utilizes conventional rotational and nonrotational drive fasteners.

It is a further object of the invention to provide a drive fastener system in which the fastener deforms as it is seated in its final position in the articles to be fastened together.

These and other objects of the invention will become apparent from the following detailed description in which reference numerals used throughout the description designate like or corresponding parts which are shown on the drawings.

BRIEF DESCRIPTION OF THE DRAWINGS

FIGS. 14–17 show alternate forms of the invention utilizing wedge-shaped washers in combination with a drive fastener.

DESCRIPTION OF THE PREFERRED EMBODIMENT

Figure 1:
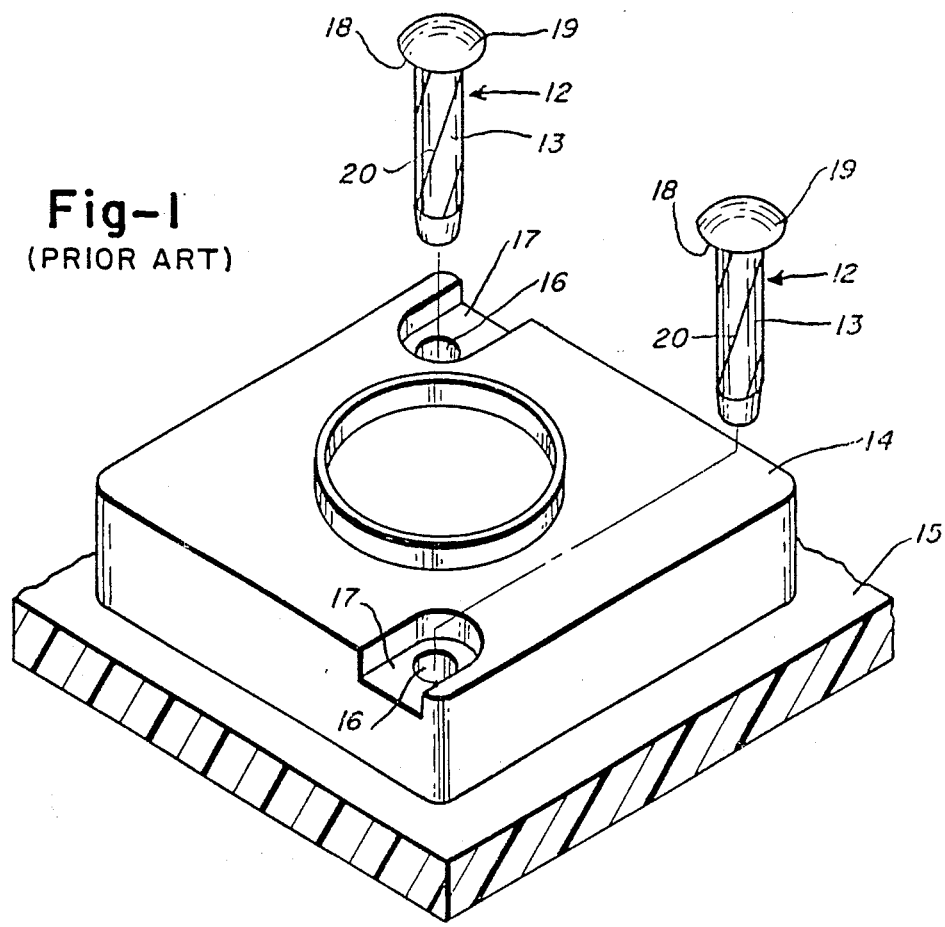
FIG. 1 shows a drive fastener system according to the prior art.

Turning now to the drawing figures, FIG. 1 shows a prior art drive fastener system in which a pair of rotational drive fasteners 12A are used to secure an article 14A to a base 15A. Each of the drive fasteners comprises an elongated body 13A which is provided with helical splines 20A and a head 19A having a bearing surface 18A formed on the underside thereof. Each fastener 12A is received by an aperture 16A in the article 14A which is surrounded by a reaction surface 17. The reaction surface 17 contacts the bearing surface 18A and is generally perpendicular to the elongated body 13A. In use, the pair of drive fasteners 12A are inserted into the apertures 16A and driven into the smaller aligned apertures (not shown) in the base 15; and the interference fit of the splines 20A in the apertures in the base 15A cause the fastener to rotate as it passes through the apertures and to form complementary threads on the aperture walls.

Figure 2:
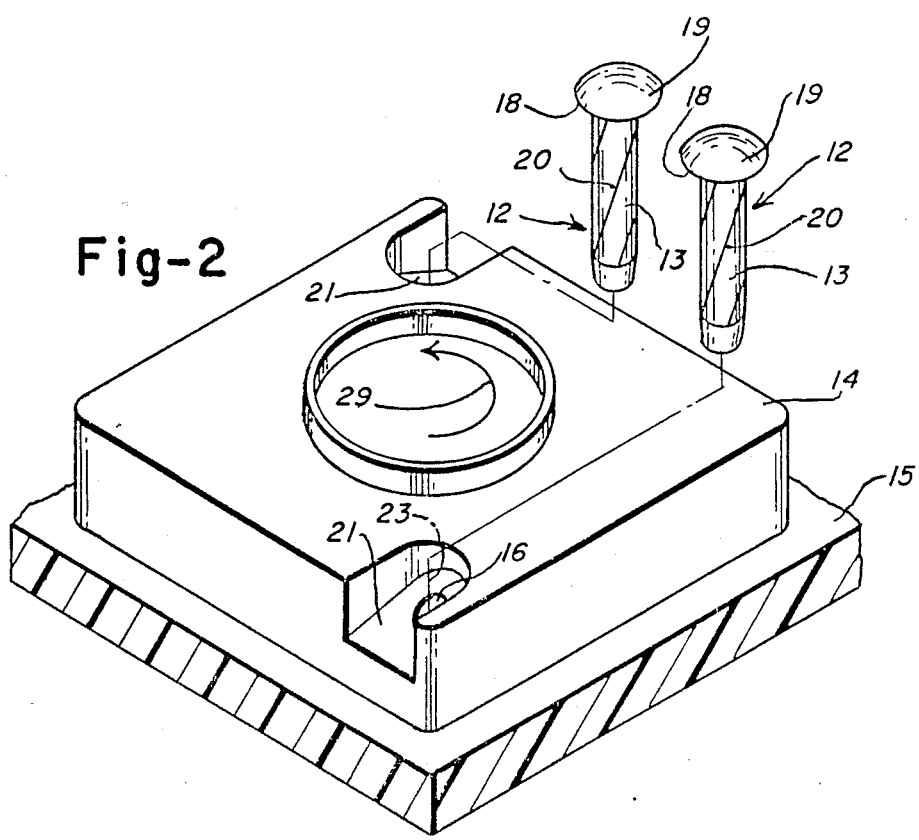
FIG. 2 is a perspective view of the drive fastener system according to the invention.

FIG. 2 shows a drive fastener system according to the invention. An article 14 which is to be fastened to a base 15 includes a pair of mounting apertures 16 (only one shown) which are dimensioned to be a clearance fit with the drive fasteners 12. A sloped reaction surface 21 formed on the article 14 immediately adjacent each mounting aperture 16 is angled relative to a plane which is perpendicular to the axis 23 of the mounting aperture 16 and relative to the bearing surface 18 of the drive fastener 12.

Figure 3:
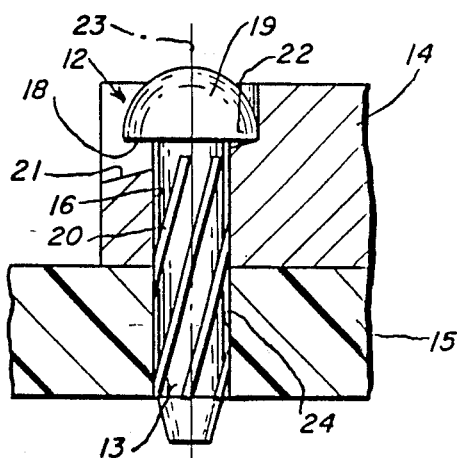
FIGS. 3, 4, 6, and 7 are sectional views showing a drive fastener securing an article to a base.

FIG. 3 shows a cross section of an article 14 which is attached to a base 15 by a rotational drive fastener 12. The mounting aperture 16 is in general alignment with a base aperture 24, and immediately adjacent the mounting aperture 16 is a sloped reaction surface 21. The sloped reaction surface 21 is planar and nonperpendicular to the axis 23 of the mounting aperture 16. As shown, the reaction surface 21 is angled relative to the bearing surface 18 on the underside of the drive fastener head causing the highest portion 22 of the bearing surface 18 to contact the sloped reaction surface 21 before the remainder of the bearing surface 18. As depicted in FIG. 3, the drive fastener 12 is not yet driven to its final position.

Figure 4:
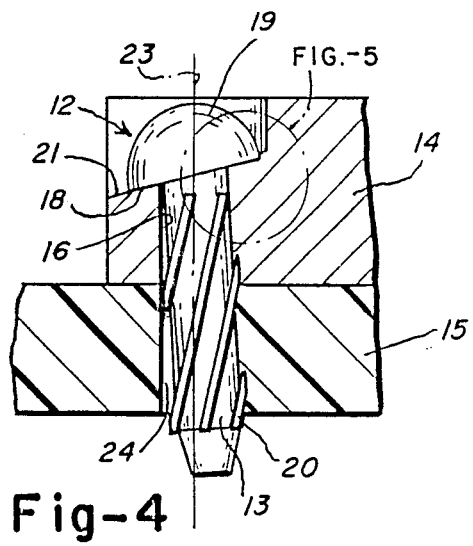
Figure 5:
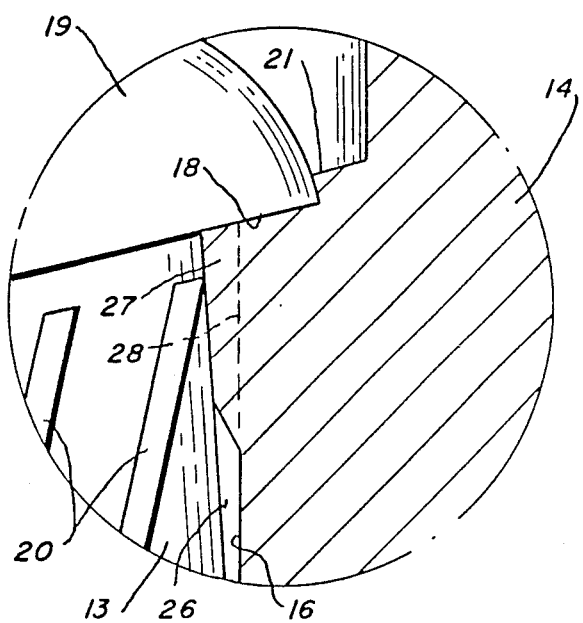
FIG. 5 is an enlarged view of a portion of FIG. 4.

FIG. 4 shows the drive fastener 12 in its final position in the mounting aperture 16. The sloped reaction surface 21 causes the entire fastener head 19 to tilt relative to the axis of the elongated fastener body 13. Additionally, the body 13 deforms or bends within the apertures 16 and 24. The deformation of the fastener body is best seen in FIG. 5 which shows a tapered gap 26 formed between the body 13 and the mounting aperture 16. The tapered gap 26 is an indication that the upper portion of the fastener body 13 is bent to the left relative to the axis 23 of the apertures 16 and 24. In actual practice, it has been found that the bending of the fastener body is not localized to the upper portion of the body which is surrounded by the aperture 16 but is distributed along the entire length of the drive fastener causing the body to develop a slightly bowed shape.

FIG. 5 also shows a mass of material 27 displaced by the bearing surface 18 into the aperture 16 between the drive fastener body 13 and the location 28 of the original aperture wall. This displaced material 27 further locks the fastener into the mounting aperture by increasing the turning resistance for the bowed fastener 12 in the apertures 16 and 24.

A rotational drive fastener system according to the invention has a much greater retention force than prior art rotational drive fasteners. It is believed that the increased retention force is created by a combination of effects:

1. The bearing surface 18 of the fastener head in contact with the angled reaction surface 21 is very difficult to counter-rotate in order to back the fastener out of the mounting aperture;
2. The bent or deformed fastener body 13 has a higher resistance to turning in the apertures 16 and 24 than a straight fastener; and
3. The material 27 which is displaced by the bearing surface 18 into the mounting aperture 16 creates an interference fit and contributes to the deformation or bending of the fastener body 13 to further inhibit counter-rotation of the fastener within the mounting aperture.

In actual practice, commercially available rotational stainless steel fasteners have been used to fasten an article 14 which is a zinc casting to a base 15 which is a glass fiber reinforced epoxy sheet. However, it will be appreciated that the article 14 and the base 15 may comprise any other materials which can be fastened together through the use of drive fasteners.

When used in the embodiment as shown in FIG. 2, the oppositely angled reaction surfaces 21 cause the bearing surfaces of the drive fasteners to impart a moment of rotation 29 to the article 14 in the direction of the arrow. The moment of rotation 29 acts to lock the drive fasteners 12 against the apertures 16 and 24 to further increase the turning resistance of the fasteners. The increased turning resistance increases the retention force of the fasteners and retention forces 3 to 4 times greater than normally exhibited by drive fasteners in a similar configuration have been measured.

Figure 6:
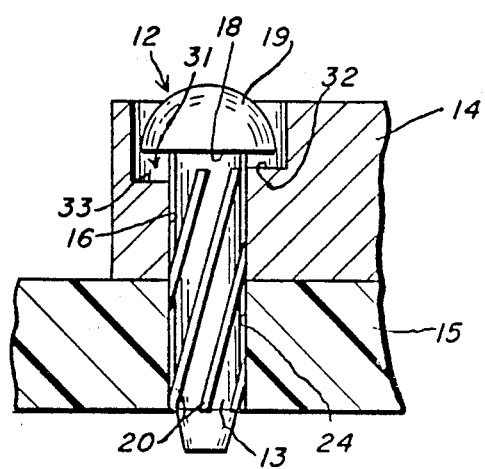

Turning now to FIG. 6, an alternate embodiment is shown in which a stepped reaction surface 31 formed around a mounting aperture 16B comprises a high step 32 and a low step 33. The stepped reaction surface 31 causes the bearing surface 18B of the drive fastener to tilt relative to the axis of the mounting aperture when the drive fastener is driven against the reaction surface. The tilting of the bearing surface 18B causes the elongated body 13B of the drive fastener to bend in the apertures 16B and 24B, and a portion of the high step 32 is displaced into the mounting aperture 16B resulting in an interference fit between the drive fastener body 13B and the mounting aperture 16B similar to that shown in FIG. 5. Other reference numerals appearing in FIG. 6 which include the suffix "B" designate structure identical to structure shown in FIGS. 2-5.

Figure 7:
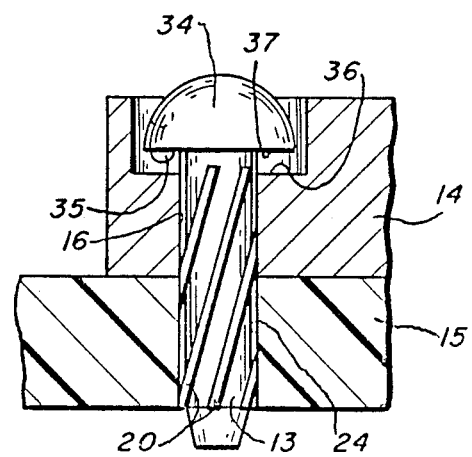

FIG. 7 shows a further embodiment of the invention in which the drive fastener head 34 is formed with an asymmetric protrusion 35 on the bearing surface 37. The protrusion 35 is formed by striking the top edge of the head 34 with a staking tool to displace a portion of the original head material below the bearing surface 37; however, the protrusion 35 may also comprise a nib of material which has been attached to or integrally fabricated on the bearing surface 37. In this embodiment, the reaction surface 36 may be perpendicular to the axis of the mounting aperture 16C and parallel to the bearing surface 37. As the fastener is driven fully into the mounting aperture 16C, the asymmetric protusion 35 bears against the reaction surface 36 causing the bearing surface 37 to tilt relative to the axis of the mounting aperture 16C. The tilting of the bearing surface causes the elongated body 13C of the fastener 12C to become deformed or bent, and the asymmetric protrusion 35 penetrates into the reaction surface 36 and displaces a portion of the material immediately adjacent the mounting aperture 16C into the mounting aperture. Other reference numerals appearing in FIG. 7 which include the suffix "C" designate structure identical to structure shown in FIGS. 2-5.

Figure 8:
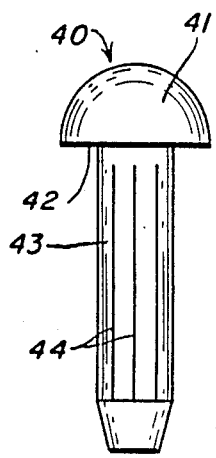
FIGS. 8 through 13 show alternate forms of drive fasteners which may be used with the drive fastener system of the invention.
Figure 9:
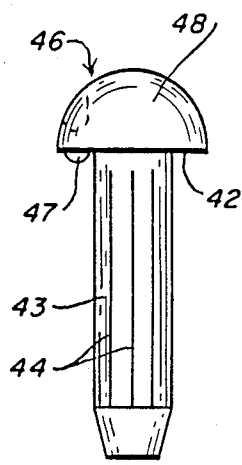

FIGS. 8 through 13 show nonrotating drive screw fasteners which may be utilized in the fastening system of the invention. FIG. 8 shows a fastener 40 including an enlarged head 41 having a bearing surface 42 on the underside thereof and an elongated body 43 with a plurality of longitudinal ribs 44. The ribs 44 are parallel to each other and to the axis of the elongated body 43. The nonrotating fastener 46 shown in FIG. 9 is similar to the fastener 40 with the exception of the asymmetric protrusion 47 formed on the underside of the enlarged head 48. Other reference numerals appearing in FIG. 9 which include the suffix "A" designate structure identical to structure shown in FIG. 8.

Figure 10:
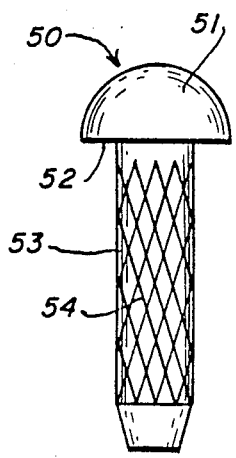
Figure 11:
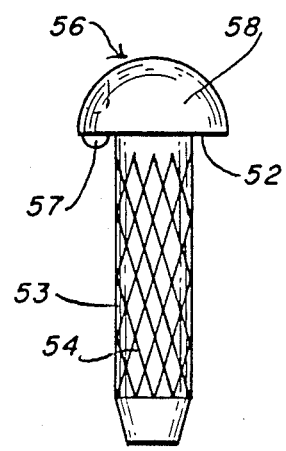

FIG. 10 shows a nonrotating drive fastener 50 having an enlarged head 51 with a bearing surface 52 formed on the underside thereof. The elongated body 53 of the fastener is provided with a knurled surface 54. The nonrotating fastener 56 shown in FIG. 11 is similar to the fastener 50 with the exception of the asymmetric protrusion 57 formed on the underside of the enlarged head 58. Other reference numerals appearing in FIG. 11 which include the suffix "A" designate structure identical to structure shown in FIG. 10.

Figure 12:
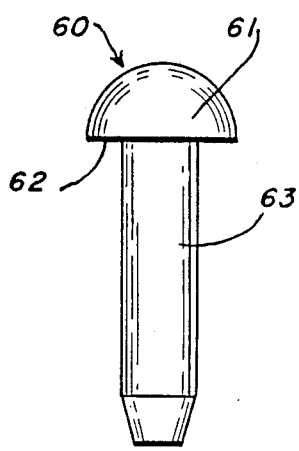
Figure 13:
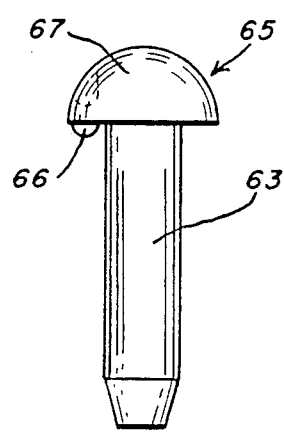

FIG. 12 shows a nonrotating fastener 60 having an enlarged head 61 with a bearing surface 62 formed on the underside thereof and a smooth elongated body 63. The nonrotating fastener 65 shown in FIG. 13 is similar to the fastener 60 with the exception of the asymmetric protrusion 66 formed on the underside of the enlarged head 67. Other reference numerals appearing in FIG. 13 which include the suffix "A" designate structure identical to structure shown in FIG. 12.

The nonrotating fasteners 40, 50, and 60 shown in FIGS. 8, 10, and 12 respectively, may be used in a fastening system as shown in FIGS. 3 through 6. Such use will cause the heads of the fasteners 40, 50, and 60, when fully seated in the item and the base, to tilt relative to the axis of the elongated fastener body. The tilt of the fastener head will cause the fastener to bend along its length, and a quantity of material surrounding the aperture in the item in which the fastener is installed to be displaced into the aperture between the fastener body and the wall of the aperture. The deformed fastener exhibits a higher retention force than a nondeformed fastener, and it is believed that the higher retention force is caused by the bending of the elongated fastener body and by the material which is forced into the aperture and blocks the withdrawal of the body therefrom.

The nonrotating fasteners 46, 56, and 65 shown in FIGS. 9, 11, and 13, respectively, may be used in a fastening system as shown in FIG. 7. The asymmetric protrusion on the fastener head as it comes into contact with a reaction surface will cause the head to tilt relative to the axis of the fastener body and the body to bend along its length. The tilted head will displace as portion of the material surrounding the aperture into the aperture, and the combination of the displaced material and the deformed fastener body will increase the retention force of the fastener for the reasons given above.

Tests have shown that although drive fasteners are normally used in an interference mode in which the diameter of the fastener body is on the order of 0.002" greater than the diameter of the base aperture, the fastener system of the invention may be used with drive fasteners in a clearance mode in which the diameter of the fastener body is slightly less than the diameter of the base aperture. Drive fasteners in a clearance mode ordinarily have no retention ability at all; however, due to the bending of the elongated drive fastener body and the displacement of material into the aperture between the fastener body and the aperture wall, a clearance mode fastener will produce a retention force in the aperture. The ability to utilize a clearance mode fastener to develop a retention force is useful in applications where it is desirable to avoid a normal interference fit between the fastener body and the aperture.

FIGS. 14-16 show an alternate embodiment of the invention in which a wedge-shaped washer 71 is used with an elongated fastener 72 to provide a sloped reaction surface 73 which contacts the underside 74 of the fastener head 76. FIG. 15 shows the fastener 72 in its final position against the wedge-shaped washer 71 in the articles which are being fastened together.

FIG. 17 shows in cross section an alternate form of a wedge-shaped washer 77 having two surfaces 78 on either side thereof which are sloped relative to the axis 79 of the washer.

The wedge-shaped washers shown in FIGS. 14-17 allow the advantages of the invention to be realized through the use of a standard driven fastener which fastens an article to a base wherein the article has a surface which is perpendicular to the axis of the mounting aperture and the wedge-shaped washer provides a sloped reaction surface.

Having thus described the invention, various alterations and modifications will appear to those skilled in the art, which alterations and modifications are intended to be within the scope of the invention as defined by the appended claims

What is claimed is:

1. A fastening system securing an article to a base with a drive fastener comprising:
   an aperture formed in the article;
   a drive fastener having an elongated splined body and an enlarged head, said head having a bearing surface formed on the underside thereof; and
   a planar reaction surface on the article which is nonperpendicular to the axis of the aperture, adjacent the aperture, and adapted to contact the bearing surface of the fastener head, said reaction surface causing said fastener head to tilt relative to the axis of the aperture and causing the body of the splined fastener to deform when it is fully driven into the article, whereby the retention force of the splined fastener is increased.

2. The fastening system of claim 1 wherein the bearing surface of the fastener head deforms the article immediately adjacent the aperture.

3. The fastening system of claim 2 wherein the bearing surface of the fastener head displaces a portion of the article surrounding the aperture into the aperture.

4. A fastening system securing an article to a base with a drive fastener comprising:
   a drive fastener having an elongated splined body and an enlarged head, said head having a bearing surface formed on the underside thereof; and
   a nonplanar reaction surface on the article adjacent the first aperture and adapted to contact the bearing surface of the fastener head, said reaction surface causing said fastener head to tilt relative to the axis of the aperture, and causing the body of the drive fastener for deform when it is fully driven into the article whereby the retention force of the drive fastener is increased.

5. The fastening system of claim 4 wherein the bearing surface of the fastener head deforms the article immediately adjacent the aperture.

6. The fastening system of claim 5 wherein the bearing surface of the fastener head displaces a portion of the article surrounding the aperture into the aperture.

7. The fastening system of claim 6 wherein the reaction surface is a stepped reaction surface, said stepped reaction surfaces having a high step which contacts the bearing surface of the fastener head before the remainder of the reaction surface.

8. A fastening system securing an article to a base with a drive fastener comprising:
   a reaction surface on the article an aperture formed through the reaction surface and the article;
   a drive fastener having an elongated splined body and an enlarged head, said head having a bearing surface formed on the underside thereof; and
   an asymmetric protrusion means formed on the bearing surface for contacting the reaction surface and causing said enlarged head to tilt relative to the elongated body and causing the body of the drive fastener to deform when it is fully driven into the article whereby the retention force of the drive fastener is increased.

9. The fastening system of claim 8 wherein the asymmetric protrusion means deforms the article immediately adjacent the aperture.

10. The fastening system of claim 9 wherein the asymmetric protrusion displaces a portion of the article surrounding the aperture into the aperture.

11. The fastening system of claim 10 further comprising:
a single nib of material comprising the asymmetric protrusion means.

12. AS fastening system for securing an article to a base with a pair of drive fasteners comprising:
a pair of mounting apertures formed in the article;
a pair of drive fasteners each having an elongated splined body and a head with a bearing surface formed on the underside thereof; and
a reaction surface means formed on the article adjacent each of the mounting apertures for causing the drive fastener heads to tilt relative to the axis of the mounting apertures and causing the bodies of the fasteners to deform when they are fully driven into the article, wherein one of the reaction surface means causes one of the drive fastener heads to tilt in a direction which is dissimilar to the direction of tilt of the other drive fastener head.

13. The fastening system of claim 12 wherein the dissimilar tilt of the two drive fastener heads creates a moment in the article which increases the retention force of the drive fasteners.

14. The fastening system of claim 13 wherein each reaction surface means is planar and is nonperpendicular to the axis of the mounting apertures.

15. The fastening system of claim 13 wherein each reaction surface means is stepped and has a raised portion which contacts the bearing surfaces of the drive fastener heads before the remainder of the reaction surface.

16. The fastening system of claim 13 wherein the pair of mounting apertures are located in diagonally opposite corners of the article.

17. A fastening system securing an article to a base with a nonrotating drive fastener comprising:
an aperture formed in the article;
a nonrotating drive fastener having an elongated body and an enlarged head, said head having a bearing surface formed on the underside thereof: and
a reaction surface on the article adjacent the aperture and adapted to contact the bearing surface of the fastener head, said reaction surface for causing said fastener head to tilt relative to the axis of the aperture and thus the body of the fastener to deform, whereby the retention force of the fastener is increased.

18. The fastening system of claim 17 wherein the reaction surface is planar, and wherein the reaction surface is nonperpendicular to the axis of the aperture.

19. The fastening system of claim 18 wherein the bearing surface of the fastener head deforms the article immediately adjacent the aperture.

20. The fastening system of claim 19 wherein the bearing surface of the fastener head displaces a portion of the article surrounding the aperture into the aperture.

21. The fastening system of claim 20 wherein the elongated body of the fastener is knurled.

22. The fastening system of claim 20 wherein the elongated body of the fastener is ribbed.

23. The fastening system of claim 20 wherein the elongated body of the fastener is smooth.

24. A fastening system securing an article to a base with a nonrotating drive fastener comprising:
an aperture formed in the article;
a drive fastener having an elongated body and an enlarged head, said head having a bearing surface formed on the underside thereof; and
a nonplanar reaction surface on the article adjacent the aperture and adapted to contact the bearing surface of the fastener head, said reaction surface for causing said fastener head to tilt relative to the axis of the aperture and the body of the fastener to deform when it is fully driven into the article whereby the retention force of the drive fastener is increased.

25. The fastening system of claim 24 wherein the bearing surface of the fastener head deforms the article immediately adjacent the aperture.

26. The fastening system of claim 25 wherein the bearing surface of the fastener head displaces a portion of the article surrounding the aperture into the aperture.

27. The fastening system of claim 26 wherein the reaction surface is a stepped reaction surface, said stepped reaction surface having a high step which contacts the bearing surface of the fastener head before the remainder of the reaction surface.

28. The fastening system of claim 27 wherein the elongated body of the fastener is knurled.

29. The fastening system of claim 27 wherein the elongated body of the fastener is ribbed.

30. The fastening system of claim 27 wherein the elongated body of the fastener is smooth.

31. A fastening system securing an article to a base with a nonrotating drive fastener comprising:
a reaction surface on the article and an aperture formed through the reaction surface and the article;
a nonrotating drive fastener having an elongated body and an enlarged head, said head having a bearing surface formed on the underside thereof; and
an asymmetric protrusion means formed on the bearing surface for contacting the reaction surface said asymmetric protrusion means causing said enlarged head to tilt relative to the elongated body and said elongated body to deform when it is fully driven into the article whereby the retention force of the drive fastener is increased.

32. The fastening system of claim 31 further comprising:
a single nib of material comprising the asymmetric protrusion means.

33. A fastening system for securing an article to a base with a pair of nonrotating drive fasteners comprising:
a pair of mounting apertures formed in the article;
a pair of drive fasteners each having an elongated body and a head with a bearing surface formed on the underside thereof; and
a reaction surface means formed on the article adjacent each of the mounting apertures for causing the bearing surfaces to tilt and the elongated bodies to bend relative to the axis of the mounting apertures.

34. The fastening system of claim 33 wherein one of the reaction surface means causes one of the bearing surfaces to tilt in a direction which is dissimilar to the direction of tilt of the other bearing surface and one of the elongated bodies to bend in a direction which is dissimilar to the direction of bend of the other elongated body.

35. The fastening system of claim 34 wherein the dissimilar tilt of the two bearing surfaces creates a moment in the article which increases the retention force of the drive fasteners.

36. The fastening system of claim 34 wherein each reaction surface means is planar and is nonperpendicular to the axis of the mounting apertures.

37. The fastening means of claim 34 wherein each reaction surface means is stepped and has a raised portion which contacts the bearing surfaces of the drive fastener before the remainder of the reaction surface.

38. The fastening system of claim 34 wherein the pair of mounting apertures are located in diagonally opposite corners of the article.

39. A fastening system comprising:
   a drive fastener having an elongated splined body and an enlarged head, said head having a bearing surface formed on the underside thereof; and
   a reaction surface adapted to contact the bearing surface of the fastener head, said reaction surface for causing said fastener head to tilt relative to the axis of an aperture in the reaction surface and causing the body of the splined fastener to deform when the enlarged head is fully driven against the reaction surface whereby the retention force of the splined fastener is increased.

40. The fastening system of claim 39 wherein the reaction surface is planar, and wherein the reaction surface is nonperpendicular to the axis of the aperture.

41. The fastening system of claim 39 wherein the reaction surface is formed on a wedge-shaped washer which is positioned against the underside of the fastener head.

42. The fastening system of claim 41 wherein the wedge-shaped washer includes at least one surface which is nonperpendicular to the axis of the washer.

43. The fastening system of claim 42 wherein the wedge-shaped washer includes two surfaces which are nonperpendicular to the axis of the aperture.

* * * * *